Aug. 30, 1966  B. N. SVENSON  3,269,587
SAFETY CLAMP FOR PRESSURE VESSEL COVERS
Filed July 6, 1965  3 Sheets-Sheet 1
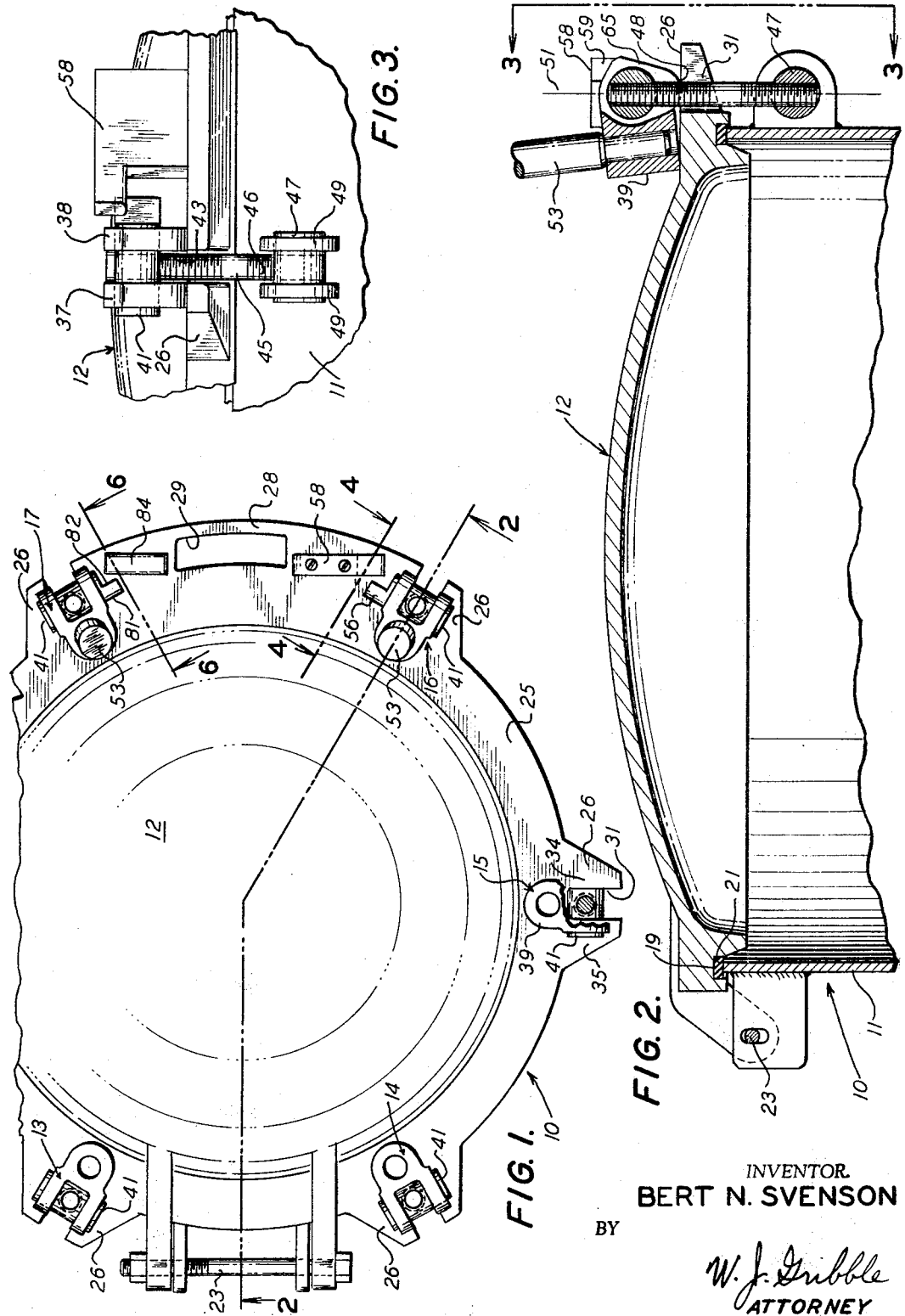
INVENTOR.
BERT N. SVENSON
BY
W. J. Gribble
ATTORNEY Aug. 30, 1966   B. N. SVENSON   3,269,587
SAFETY CLAMP FOR PRESSURE VESSEL COVERS
Filed July 6, 1965   3 Sheets-Sheet 2

INVENTOR.
BERT N. SVENSON
BY
W. J. Gribble
ATTORNEY

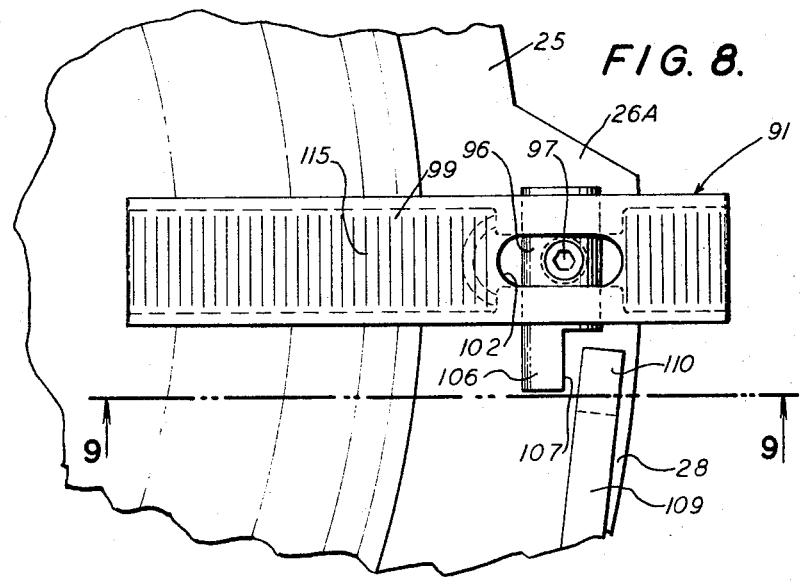
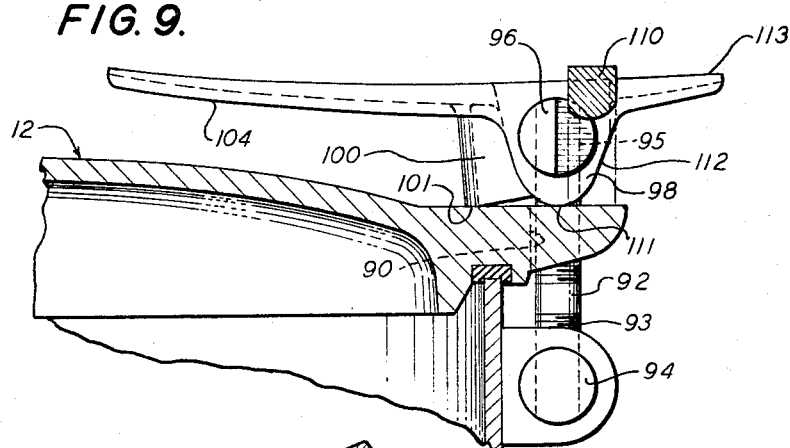
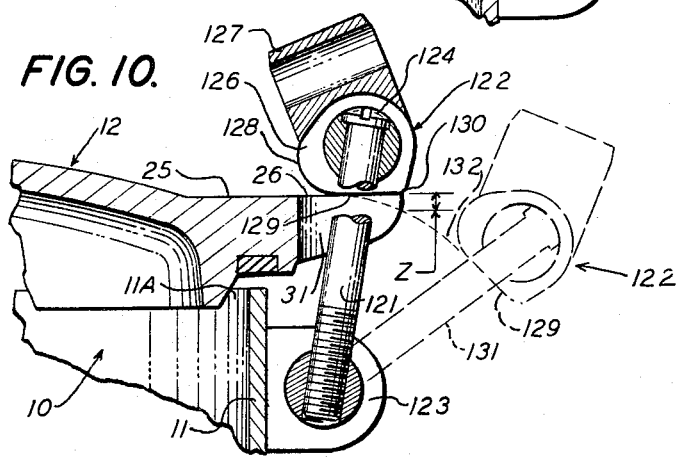

United States Patent Office
3,269,587
Patented August 30, 1966

1

3,269,587
SAFETY CLAMP FOR PRESSURE VESSEL COVERS
Bert N. Svenson, 10747 Spry St., Norwalk, Calif.
Filed July 6, 1965, Ser. No. 469,664
11 Claims. (Cl. 220—55.3)

This application is a continuation-in-part of my copending patent application Serial No. 385,391, entitled "Adjustable Clamp" and filed July 27, 1964.

The invention relates to pressure vessels, and more particularly to the hold-down cam clamps by which the covers of pressure vessels are secured to the vessel openings.

As pointed out in that application, the hold-down clamps are conventionally used in pluralities and spaced an equal distance apart around the cover of the vessel. The clamps bear upon the cover so that the cover is thrust upon the rim of the vessel opening. Conventionally there are notches in the projecting cover rim through which elongate tension members of the cam clamp project upwardly. The rim area about each notch comprises a thrust surface against which camming elements of the clamp bear to urge the cover toward sealing relationship with the opening of the vessel. The camming elements are attached to that portion of the tension member extending above the cover rim.

The conventional cam clamp operates on a toggle principle in which the final clamping position of the clamp member or cam lobe is "over center" so that the resultants of the clamping forces tend to keep the cam lobe in a locked position.

The elongate tension member of the clamp assembly is conventionally mounted pivotally with respect to the side wall of the pressure vessel below the protruding cover rim. Preferably the cam lobes are adjustable along the member. When the clamp apparatus is fully opened, the cam lobes are removed from their over-center position and swing away from the cover rim and out of contact with the cover.

There is danger when removing covers from pressure vessels that the clamps which secure the pressure vessel cover to the opening of the vessel may all be pivoted out of contact with the cover before the pressure within the vessel is entirely relieved. With the restraining contact of the clamps removed around the periphery of the cover, the cover is free to remove from the vessel under urging of the confined pressure. Depending upon the magnitude of the pressure, the velocity of the cover can inflice slight to severe injury and damage.

I have invented clamping apparatus that may be combined with conventional over-center pressure vessel clamps in which the clamp includes a cover-contacting cam lobe rotatable about an arbor secured to an end of an elongate tension member pivotally mounted to the side wall of the pressure vessel. The apparatus of my invention also may be combined with the clamping apparatus of the copending application set forth above, and with the apparatus of another copending application, Serial No. 407,439 filed October 29, 1964, and entitled "Clamping Apparatus."

The present invention contemplates a pressure vessel that has a pressure chamber and a removable cover with a rim extending outwardly beyond the external wall of the chamber. Pivot mounts at spaced intervals about the wall periphery support cover cam clamps that are adapted to urge the cover against the chamber in sealing relationship. Means on one or more clamps is adapted to pivot outwardly with the outward pivot motion of a cover cam clamp and engage the cover rim adjacent the clamp so as to limit the outward swing of the cam clamp beyond that position inhibiting removal of the cover until the cover is displaced with respect to the vessel opening to disengage the limit means from the cover. The means may comprise a limit arm on the clamp and a stop on the cover.

The stop on the cover may either be cast integrally with the cover or may be a shaped attachment bolted, welded or otherwise secured to the cover. In the preferred embodiment the limit arm is a projection of the cam arbor. The limit arm may also be a projection of the clamping cam lobe.

The invention affords economical and easily operated apparatus for protecting the pressure vessel and those attending it. The cover may be removed expeditiously without danger to the workman from a cover impelled violently away from the pressure vessel due to unreleased internal pressures.

These and other advantages of the invention are apparent from the following detailed description and drawing in which:

FIG. 1 is a fragmentary plan view, partly broken away, of a pressure vessel in accordance with the invention;

FIG. 2 is a fragmentary sectional elevation taken along line 2—2 of FIG. 1;

FIG. 3 is a fragmentary elevational view taken along line 3—3 of FIG. 2;

FIG. 8 is a fragmentary plan view of a further alternate embodiment of the invention;

FIG. 9 is a fragmentary sectional elevation taken along line 9—9 of FIG. 8; and

FIG. 10 is a fragmentary sectional elevation of a further alternate embodiment.

Figure 4:
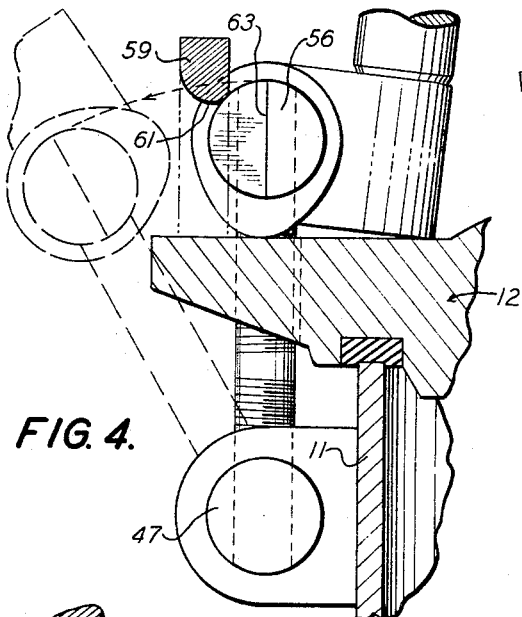
FIG. 4 is a schematic fragmentary sectional elevation taken along line 4—4 of FIG. 1.

FIGS. 1-5 illustrate a preferred embodiment of the invention. In these figures a pressure vessel 10 of substantially cylindrical configuration has a vessel wall 11 and a domed cover 12. The cover is held in sealing relationship on the vessel by a plurality of evenly spaced adjustable cam clamps, of which clamps 13, 14, 15, 16 and 17 are shown. Clamps 13, 14 and 15 are substantially identical. Clamps 16 and 17 differ from the other only slightly, as will be pointed out later.

As can be seen in FIG. 2, the cover has a gasket annulus 19 in which a resilient gasket 21 is seated. The cover is hinged by a pin 23 mounted to wall 11. The cover is related by the hinge to the pressure vessel such that gasket 21 seats upon the top surface of vessel wall 11. When the clamps are in locked position, as shown in FIGS. 1-3, the cover is forced against the pressure vessel and is sealed thereto along the gasket 21.

Referring again to FIG. 1, the cover has a rim 25 from which a plurality of tabs 26 project. The tabs 26 adjacent clamps 16 and 17 are connected by a web 28. A handle aperture 29 extends through web 28 and affords convenient means for moving the cover about pivot pin 23.

Each tab has a vertical notch 31 which extends radially the full depth of the tab. The notch separates two thrust surfaces 34, 35 on each tab. The thrust surfaces are contacted by the spaced identical cam lobes 37, 39 of each preferred clamp assembly. The cam lobes are joined by a handle boss 39. The lobes and handle boss are journalled upon the cylindrical cam arbor 41. Each cam arbor is internally threaded transversely at its center to receive a first threaded portion 43 of an elongate threaded tension member 45. The tension member has a second lower threaded portion 46, preferably having a thread of opposite hand to that of the first threaded portion 43. Second threaded portion 46 is engaged in a tension member pivot pin 47 that is mounted to rotate in pivot ears 49, fixed to wall 11 of the pressure vessel.

The cam lobes may be rotated about their respective cam arbors such that the greatest cam extension or bearing surface 48 is directed downwardly when the handle boss is in contact with the rim 25 of the cover. The handle boss acts as a stop, limiting rotation of the cam lobes about their respective cam arbors such that the maximum bearing surface extension of the cam lobe is in contact with the thrust surface 34 or 35 when the bearing surface is rotated slightly past the vertical axis 51 of the tension member. This is the over-center position of the cam that keeps it locked until exterior force is applied to the handle boss to rotate it past center again for opening. Conventional handles, such as the handle 53, may be used for leverage in turning the cam lobes about the cam arbors. As can be seen in FIG. 2, and in more detail in FIG. 4, that portion of the cam lobe periphery 90° displaced from the maximum cam lobe extension or bearing surface is less displaced from the center of rotation than is the maximum bearing surface extension. As can be seen in FIG. 5, when the cam lobes are rotated about the cam arbor by means of handle 53, the distance between the center of rotation of the pivot pin 47 and the lower lobe surface is increased. This permits the pressure vessel cover to move from the top surface of the vessel wall. The pressurized materials or gases within the pressure vessel thus have an opportunity to exhaust.

Conventionally, the cover tends to lift away from the pressure vessel wall when all the clamping cam lobes are rotated about their cam arbors. However, the clamping cams are free to be pivoted about the axis of pivot pins 47 when unclamped. If all of the clamping cams are moved outwardly through the notches 31 such that no clamp is in contact with the cover, the cover may remove explosively from the pressure vessel with the removal of the last clamp. Therefore, the inventive apparatus includes a limit arm 56 that extends from an end of the cam arbor to overlap a stop 58 secured to the rim of the cover. Preferably the two cam clamps remote from the hinge pin have limit arms. Stop 58 has a contact tab 59 with a shaped bottom surface 61. Bottom surface 61 of the tab is displaced from thrust surface 34 of tab 26 such that a flat contact surface 63 of limit arm 56 strikes contact tab 59 if the cover is still in sealing relationship to the pressure vessel wall 11. Surface 63 is substantially parallel to the axis of tension member 45. However, as can be seen in FIG. 5, when the cam lobes have been rotated such that cover 12 is displaced from the top of pressure vessel wall 11, contact surface 63 of the limit arm is not interfered with by contact tab 59 and cam clamp 16 may be swung outwardly about pivot pin 47 to free the cover for complete opening.

It is important to note that the freedom to move cam clamp 16 out of contact with the cover is dependent upon the upward displacement of the cover from the vessel wall and not merely upon rotation of the cam lobes. Contact surface 63 of limit arm 56 is maintained in substantially parallel relationship to the axis of the tension member by the connection between the cam arbor and the threaded tension member. Thus, rotation of the cam does not effect a reorientation of the contact surface to permit its passage between the bearing surface of the tab and the lower surface 61 of the contact tab. Therefore, the embodiment schematically illustrated in FIGS. 4 and 5 give a positive safety mechanism which prevents displacement of the clamp from the cover until pressure has been released from the pressure vessel.

Figure 5:
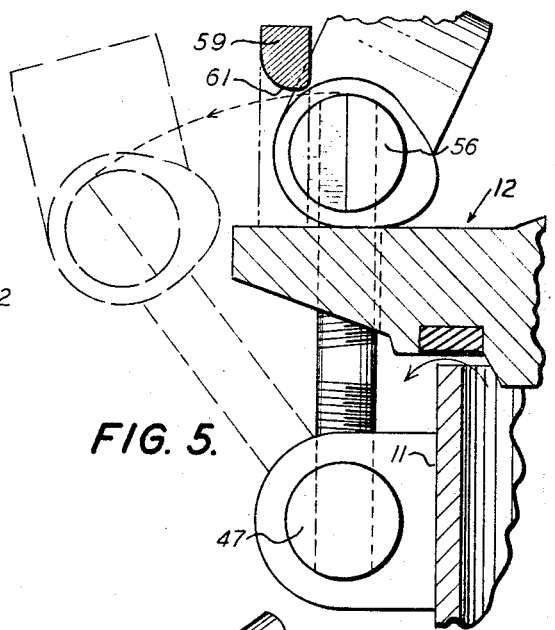
FIG. 5 is a fragmentary schematic sectional elevation similar to FIG. 4 showing the apparatus in a different operative position.
Figure 6:
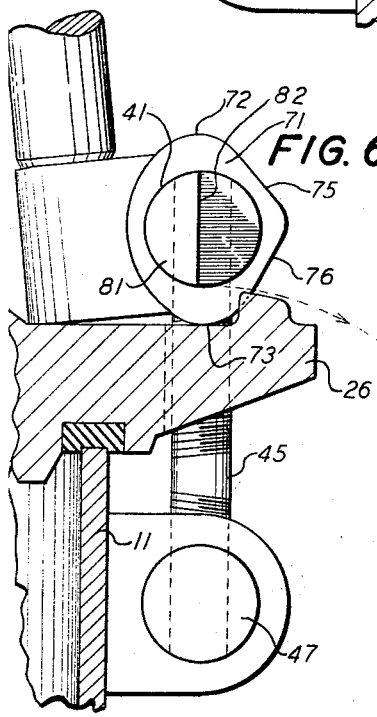
FIG. 6 is a schematic fragmentary sectional elevation taken along line 6—6 of FIG. 1 and showing an alternate embodiment of the invention.

The cam lobes may be substantially curvilinear in outer periphery, as shown in FIGS. 4 and 5, or alternatively, may have a flatted minimal portion 65, as shown in FIG. 2. The over-center clamp assembly 17 of FIG. 1 and FIGS. 6 and 7 has opposed cam lobe bearing surfaces that provide for half-thread adjustment of clamping pressure. As shown schematically in FIGS. 6 and 7, each of the spaced cam lobes 71 has a first bearing surface 72 diametrically opposed to a second bearing surface 73. In FIG. 6 second bearing surface 73 is in contact with the thrust surface of tab 26 such that the cover is secured in sealing relationship to the vessel wall 11. Intermediate the two opposed cam lobe bearing surfaces are two diverging flat surfaces 75, 76. The flats are tangent to a common circle having a lesser diameter than that circle which contains the bearing surfaces 72, 73. Thus when the cam lobes are rotated, as in FIG. 7, such that a flat surface 76 thereof is horizontal, the distance between the center of pivot pin 47 and the surface 76 is greater than the distance between the pivot pin center and bearing surface 73. Therefore, when all of the clamps are in unlocked position the cover is free to rise from the vessel wall 11 and discharge the pressure contained therein.

A limit arm 81 extends from cam arbor 41. The limit arm has a contact face 82 whose orientation is substantially vertical and parallel to the axis of the tension member. The vertical orientation is maintained because of the threaded engagement between the tension member and the cam arbor. In this orientation the contact face engages a stop 84 which projects from the cover rim web 28.

Figure 7:
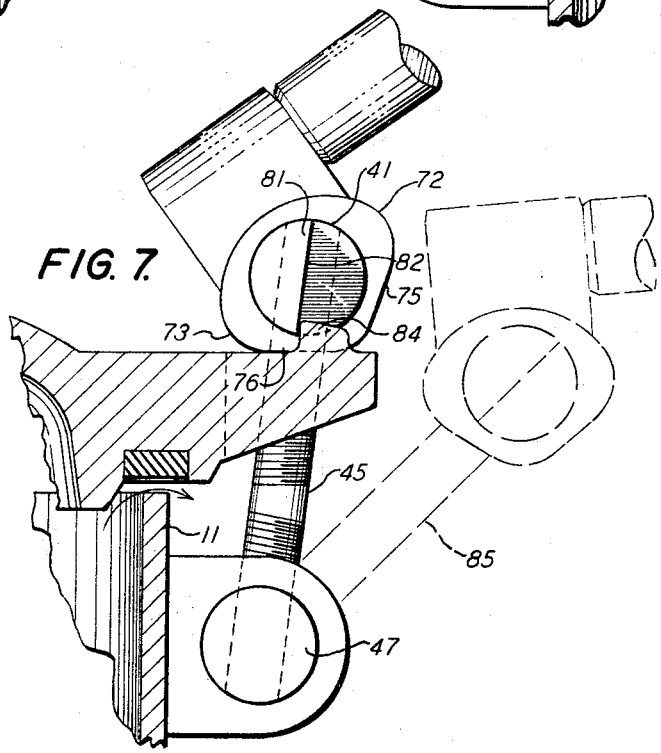
FIG. 7 is a sectional elevation similar to FIG. 6 showing the apparatus of that embodiment in a different operative position.

As shown in FIG. 7, the contact face of the limit arm engages stop 84 when the cover is removed upwardly from pressure vessel wall 11. The apparatus of the embodiment of FIGS. 6 and 7 therefore precludes precipitous removal of the cover from the pressure vessel when all of the other cam clamps have been opened and the cam lobes of cam assembly 17 rotated into the position of FIG. 7. It is then necessary to allow the pressure to escape and to restore the cover to the orientation of FIG. 6 before the cam assembly may be pivoted outwardly to the dotted position 85 of FIG. 7, in which position there is nothing to inhibit complete displacement of the cover about hinge pin 23 and away from the pressure vessel opening.

The embodiment of FIGS. 8 and 9 illustrates fragmentarily a pressure vessel 10 having a vertical outer wall 11 of substantially cylindrical configuration and sealed by a domed cover 12. A rim 25 projects outwardly on the cover. Like previous embodiments, a plurality of tabs, such as the tab 26A, extend from the cover rim. A web 28 connects adjacent tabs on that rim of the cover remote from the hinge pin (not shown). A notch 90, whose inner limit is shown in dotted line in FIG. 9, extends radially in the tab. A cam clamp assembly 91 co-operates with other clamp assemblies (not shown) to lock the cover across the pressure vessel opening. Like the previous embodiments, cam clamp assembly 91 has a threaded tension member 92. A bottom threaded portion 93 is threadably tension member 92. A bottom threaded portion 93 is threadably engaged with a pivot pin 94 that is pivotally mounted to wall 11. An upper threaded portion 95 of the tension member is threadably engaged with a cam arbor 96.

The tension member has an upper wrench socket 97 which affords means for turning the tension member and thus adjusting the clamping pressure of the clamp. The previously described embodiments may also be provided with such a wrench socket. The previous embodiments have illustrated the apparatus of the invention combined with cam lobes having a single bearing surface and cam lobes with opposed bearing surfaces, both joined by a handle boss. The cam lobes 98 of the embodiment of FIGS. 8 and 9 are joined together by a foot plate 99 that extends inwardly and outwardly on both sides of the cam arbor. A hollow boss 100 protrudes below the foot plate and has a lower surface 101 which acts as a stop when it contacts the thrust surface of the cover rim. The foot plate enables the cam lobes 98 to be rotated about the cam arbor by the foot of a user. Thus there is no need for the handles 53 of the previous embodiments.

A vertically extending cavity 102 through the foot plate and hollow boss affords articulation for the cam lobes about the arbor and tension member. The foot plate is strengthened by depending parallel ribs 104 on each edge of the plate.

A limit arm 106 extends from the cam arbor. A contact face 107 on the limit arm is oriented vertically and is substantially parallel to the axis of the tension member. A stop 109 substantially similar to the stop 58 of FIGURES 1–5 is fixed to web 28 of the cover. A stop tab 110 spaced vertically from the thrust surface of the tab precludes pivot motion of the clamp assembly, as in the operation of the apparatus of FIGS. 1–5.

Cam lobes 98 have a bearing surface 111 which has a great extension from the pivot axis of the cam lobes. A flat cam surface 112 is displaced 90° rotationally from bearing surface 111. In the orientation of FIG. 9 the cam clamp assembly is locked in sealing position. When foot pressure on end 113 of the foot plate rotates the cam lobes flat 112 becomes adjacent the thrust surface of the cover. Cover 12 is then free to move from the pressure vessel. However, the cover must elevate sufficiently above the vessel to discharge internal pressures before limit arm 106 is free to pass between stop tab 110 and the thrust surface of the cover.

In the embodiment illustrated in FIG. 10, a pressure vessel 10 has a substantially cylindrical wall 11 defining an opening 11A. A domed cover 12 is adapted to seal the opening. The cover has a rim 25 with tabs such as tab 26 extending therefrom. Each tab has a radial notch such as notch 31 through which an elongate tension member 121 of a clamping assembly 122 extends. The tension member is pivotally mounted to wall 11 by a pivot pin 123 with which the member is threadably engaged. The upper end of the tension member has a head 124 that resides in a cam arbor 125. The tension member may be turned within the cam arbor to adjust the clamping tension.

A pair of cam lobes, of which lobe 126 is shown, is journalled on the cam arbor. A handle boss 127 joins the cam lobes. The lobes are substantially identical in surface configuration, each having a bearing surface 128 of maximum extension from the center of rotation of the lobes about the arbor and a flat stop surface 129 rotationally removed from the bearing surface. The stop surface terminates in a corner 130 that extends from the center of rotation less than bearing surface 128 but more than the minimum extension of the cam lobes.

Normally the clamping assembly locks the cover in sealing relationship when assembly 122 and other assemblies of the pressure vessel have the cam lobes positioned so that bearing surfaces 130 of the respective assemblies thrust against the cover rim. As shown in FIG. 10, when the cam lobes are turned such that stop surface 129 is adjacent the rim or tab, the cover may lift from the opening. However, because stop surface 129 the clamp assembly cannot readily be pivoted outwardly to the dotted position 131, since the raised cover inhibits the motion of the cam lobe as shown by dotted path 132. The cover must be depressed toward the opening to permit stop surface 129 to pass the cover rim. The cover can be depressed only with great effort until internal pressures are released. A workman is thus prevented from pivoting the clamp assembly from the cover rim until pressure subsides.

The flat stop surface inhibits continued motion outward of the cam lobes because it affords no rolling contact with the rim as do conventional cam lobes with their continuously curving contact surfaces.

The apparatus of the invention requires no expensive fabrication or materials. It is easily adapted to conventional over-center cam clamps. Little or no vibration in conventional clamping procedures is required. Only a few of the many modifications of the invention have been disclosed in the illustrative apparatus described herein. Many other modifications will appear to those skilled in the art within the scope of the invention. Therefore, I desire that the invention be measured by the appendd claims rather than by the purely illustrative embodiments disclosed herein.

I claim:

1. A pressure vessel comprising a pressure chamber, a cover, a cover rim, a plurality of over-center cam clamps each pivotally mounted to the vessel wall at intervals thereabout and adapted to bear selectively on the cover rim to seal the cover against the vessel, and limit means on a cam clamp adapted to pivot outwardly with the cam clamps and engage the cover rim adjacent the clamp so as to limit the outward swing of the cam clamp beyond that position inhibiting removal of the cover until the cover is displaced with respect to the vessel opening to disengage the limit means from the cover rim.

2. Apparatus in accordance with claim 1 wherein the limit means comprises a limit arm extending from the cam clamp and a stop on the cover rim.

3. Apparatus in accordance with claim 1 wherein the limit means comprises a flat stop surface on the clamp cam adapted to be selectively seated against the cover rim.

4. A pressure vessel comprising a pressure chamber, a cover, a cover rim, a plurality of over-center cam clamps each pivotally mounted to the vessel wall at intervals thereabout and adapted to bear selectively on the cover rim to seal the cover against the vessel, a limit arm adapted to pivot outwardly with the outward pivot motion of a cam clamp, and a stop on the cover rim adjacent the cam clamp having the limit arm associated therewith, said stop being adapted to engage the limit arm so as to preclude outward swing of the cam clamp beyond that position inhibiting removal of the cover from the pressure vessel, the stop extending in the direction of cover removal so as to contact the limit arm until the cover has been displaced from the pressure vessel sufficiently to allow discharge of pressure from the vessel.

5. A cam clamp for use with a pressure vessel having a cover with an extending notched rim and pivot mounts exteriorly of the vessel wall and comprising a tension member engaged with a pivot mount, a cam arbor engaged with the end of the tension member remote from the pivot mount, a cam lobe on the cam arbor rotatable with respect to the tension member, means for rotating the cam lobe, a cam lobe bearing surface adapted to thrust against the cover rim and urge the cover into sealing engagement with the pressure vessel, a second cam lobe surface of lesser extension from the cam lobe axis of rotation than the bearing surface, a stop extending above the cover rim, and a limit arm extending from the cam assembly so as to be engageable by the stop, said stop having an extent in the direction of cover removal from the pressure vessel such that outward pivoting of the cam clamp is precluded by limit arm contact with the stop when the cam lobe has been rotated to place the second cam lobe surface adjacent the surface of the cover rim.

6. A cam clamp for use with a pressure vessel having a cover with an extending notched rim and pivot mounts exteriorly of the vessel wall and comprising an elongate threaded tension member engaged with a pivot mount, a cylindrical cam arbor engaged with the end of the tension member remote from the pivot mount, a cam lobe journalled on the cam arbor, means for rotating the cam lobe about the cam arbor, a cam lobe bearing surface adapted to thrust against the cover rim and urge the cover into sealing engagement with the pressure vessel, a second cam lobe surface of lesser extension from the cam arbor axis than the bearing surface, a stop extending above the cover rim, a limit arm extending from the cam arbor, and a vertical contact flat on the limit arm adapted to engage the stop, said stop having an extent in the direction of cover removal from the pressure vessel such that outward pivoting of the cam clamp is precluded by limit arm contact with the stop when the cam lobe has been rotated to place the second cam lobe surface adjacent the surface of the cover rim.

7. A cam clamp for use with a pressure vessel having a cover with an extending notched rim and pivot mounts exteriorly of the vessel wall and comprising a threaded tension member engaged with a pivot mount to pivot toward and away from a notch in the cover rim, a cylindrical cam arbor engaged with that end of the tension member remote from the pivot mount, a cam lobe journalled on the cam arbor, means for rotating the cam lobe about the cam arbor, a cam lobe bearing surface adapted to thrust against the cover rim and urge the cover into sealing engagement with the pressure vessel, and a second cam lobe surface of lesser extension from the axis of rotation of the cam lobe than the bearing surface, said second cam lobe surface being substantially planar and extending away from the bearing surface to terminate in a corner having a lesser extent from the cam lobe axis of rotation than the bearing surface and a greater extension from the cam lobe axis of rotation than the rest of the cam lobe second surface such that rotation of the bearing surface from contact with the cover rim moves the second cam lobe surface adjacent the rim to permit removal of the cover away from the vessel while inhibiting outward swinging of the cam clamp out of contact with the cover rim.

8. Apparatus in accordance with claim 7 wherein the means for rotating the cam lobe about the cam arbor comprises a foot plate fixed to the cam lobe opposite the bearing surface thereof and extending in the plane of cam clamp pivoting from the cam lobe in both directions, and a contact boss protruding from the cam lobe so as to contact the cover rim as a stop when the bearing surface is in over-center position against the cover rim.

9. A cam clamp for use with a pressure vessel having a cover with an extending notched rim and pivot means mounted exteriorly to the vessel wall and comprising a threaded elongate tension member engaged with a pivot means to pivot toward and away from a notch in the cover rim, a cam arbor engaged with that end of the tension member remote from the pivot means, a cam lobe on the cam arbor and adapted to rotate with respect to the tension member, a cam lobe bearing surface adapted to thrust against the cover rim and urge the cover into sealing relationship to the pressure vessel, a second cam lobe surface of lesser extension from the axis of cam lobe rotation than the bearing surface, a foot plate adapted to rotate the cam lobe and fixed to the cam lobe opposite to the bearing surface thereof and extending in the plane of pivoting of the cam clamp in both directions from the cam lobe, and limit means on the cam clamp adapted to engage the cover rim adjacent the clamp so as to limit the outward swing of the cam clamp beyond that position of the clamp inhibiting removal of the cover until the cover is displaced with respect to the vessel opening to disengage the limit means from the cover rim.

10. Apparatus in accordance with claim 9 wherein the limit means comprises a limit arm extending from the cam arbor and a stop on the cover rim.

11. Apparatus in accordance with claim 9 wherein the limit means comprises a flat stop surface on the cam lobe adapted to seat against the cover rim when the cam lobe is rotated to remove the bearing surface from contact with the cover rim.

References Cited by the Examiner
UNITED STATES PATENTS

| | | | |
|---|---|---|---|
| 1,019,094 | 3/1912 | Skahen | 220—55 |
| 2,596,353 | 5/1952 | Zollinger | 220—55.3 |

THERON E. CONDON, *Primary Examiner.*

G. T. HALL, *Assistant Examiner.*